United States Patent [19]

Gilb

[11] 4,007,573
[45] Feb. 15, 1977

[54] TRUSS TOP BEARING CLIP

[75] Inventor: Tyrell T. Gilb, Berkeley, Calif.

[73] Assignee: Simpson Manufacturing Co., Inc., San Leandro, Calif.

[22] Filed: Feb. 9, 1976

[21] Appl. No.: 656,308

[52] U.S. Cl. .................................. 52/696; 52/693; 403/188

[51] Int. Cl.² .......................................... E04C 3/02

[58] Field of Search ........................... 52/690–696, 52/753 C, 753 L, 639, 751, 90

[56] References Cited

UNITED STATES PATENTS

| | | | |
|---|---|---|---|
| 3,091,822 | 6/1963 | Fiekers et al. | 52/753 C |
| 3,330,087 | 7/1967 | Troutner | 52/693 |
| 3,422,591 | 1/1969 | Troutner | 52/693 |
| 3,946,532 | 3/1976 | Gilb | 52/693 |

*Primary Examiner*—J. Karl Bell
*Attorney, Agent, or Firm*—James R. Cypher

[57] ABSTRACT

A truss top-bearing clip forming a part of the end bearing joint assembly for trusses having a pair of parallel wood members and a metal end web such as a tubular flattened end web. The clip is fabricated from flat sheet metal using standard punch-press operations. The ends of the metal truss webs are connected to the clips so that the web load is transferred directly to the clip via metal-to-metal contact. The top wood chords are connected to the clips and bear on the flanges of the clips.

7 Claims, 12 Drawing Figures

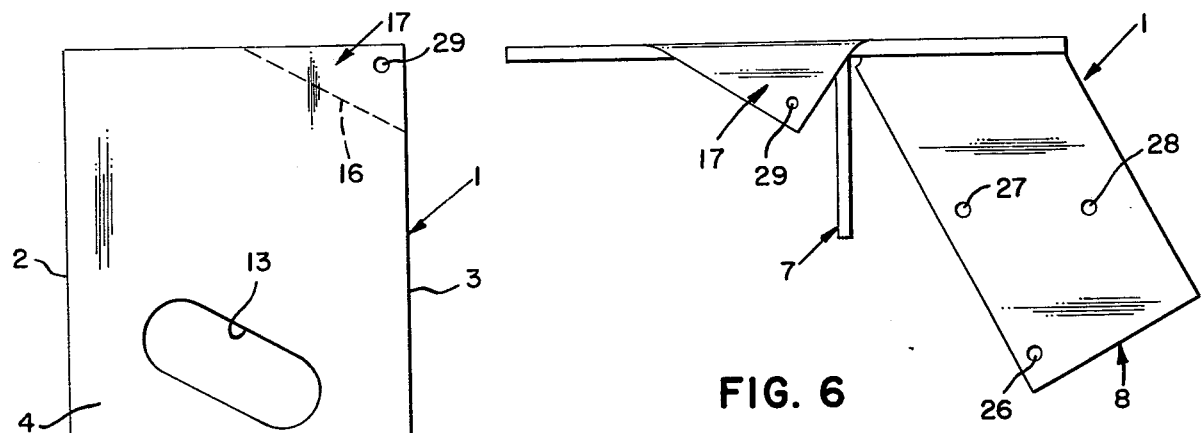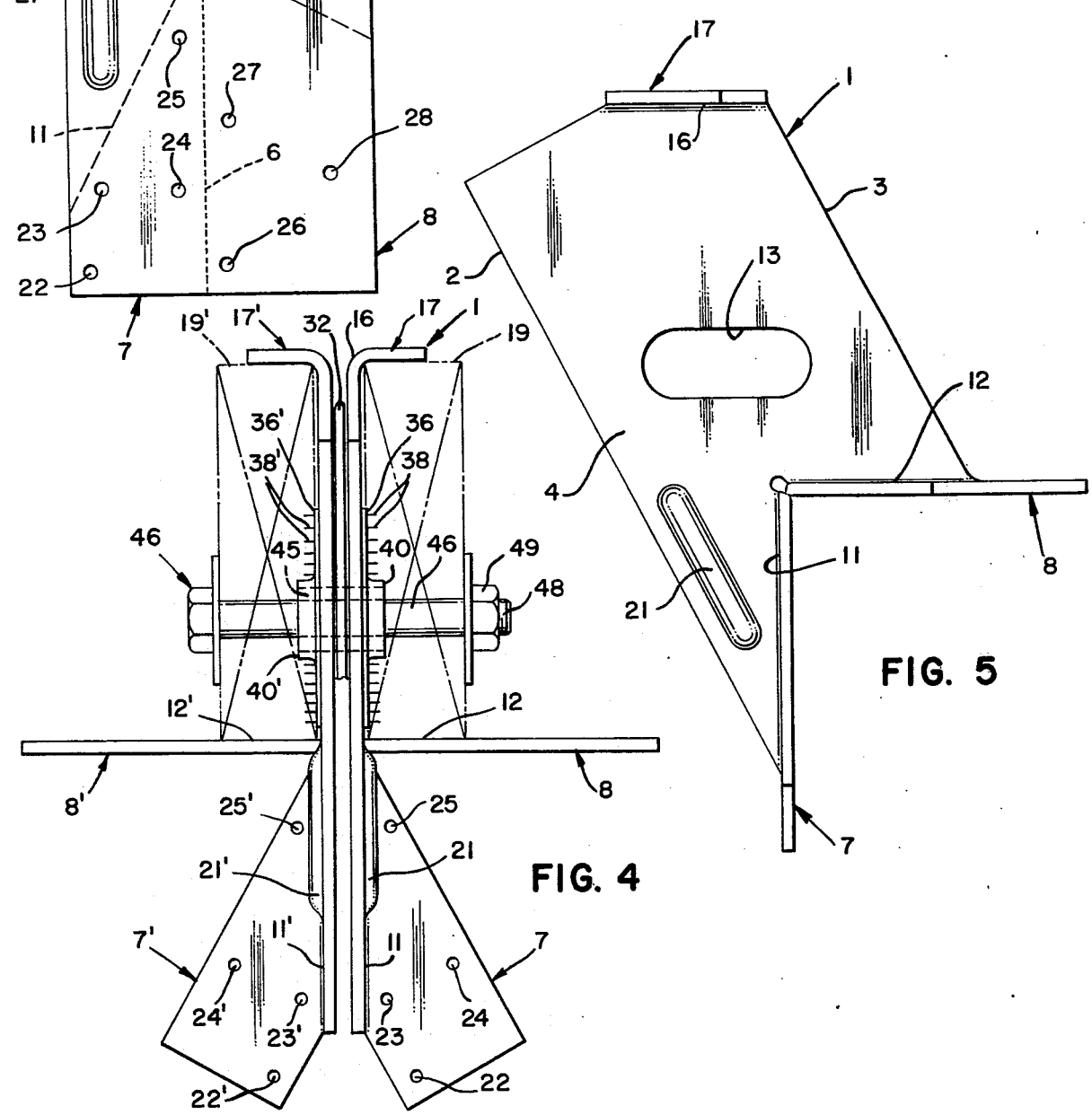

TRUSS TOP BEARING CLIP

BACKGROUND OF THE INVENTION

Attachment of the ends of composite trusses to the upper sides of end bearing walls presents special problems. Tension forces in the end webs are greatest at the end joint yet the joint is spaced away from the wall creating rotational problems in the truss ends. Further, walls are never perfectly aligned so that there must be some adjustment in the clips to accommodate the variance in span.

Simple metal angles used in prior art clips either required notching of the bearing plates or the truss chords in order to seat the top wood chord on the supporting wall and enable the metal web to clear the side of the wall. Other clips required special bolt tubes to transfer loads from the wood chords to the end clips but resulted in weakening of the chords because of the need to remove additional wood from the bore holes.

Summary of the Disclosure

The gist of the present invention is the utilization of a top-bearing clip for composite trusses which may be fabricated by standard punch-press operations from a strip of sheet metal. The clips are fabricated without any welds or other fasteners and are therefore less expensive to fabricate, lighter and easier to install.

A feature of the present invention is the adjustability of the clip.

Still another feature of the design is the fact that clips capable of use with different load capacity trusses can be fabricated from a strip of metal having the same width with basically one set of tooling dies.

A further feature of the present invention is the fact that the use of the clips as described does not require any modification of the joint assembly of the truss or any modification such as cutting or drilling of the wood chords of the truss.

BRIEF DESCRIPTION OF THE DRAWINGS

FIG. 4 is a front elevation view of the truss top-bearing clips and the truss joint assembly. The top chords of the truss are shown in cross section.

FIG. 5 is a side elevation view of one of the truss top-bearing clips shown in FIG. 2.

FIG. 6 is a top plan view of the clip shown in FIG. 5.

FIG. 7 is a side elevation view of the clip shown in FIGS. 2, 5 and 6 prior to bending of the sheet metal.

DESCRIPTION OF THE PREFERRED EMBODIMENTS

Figure 1:
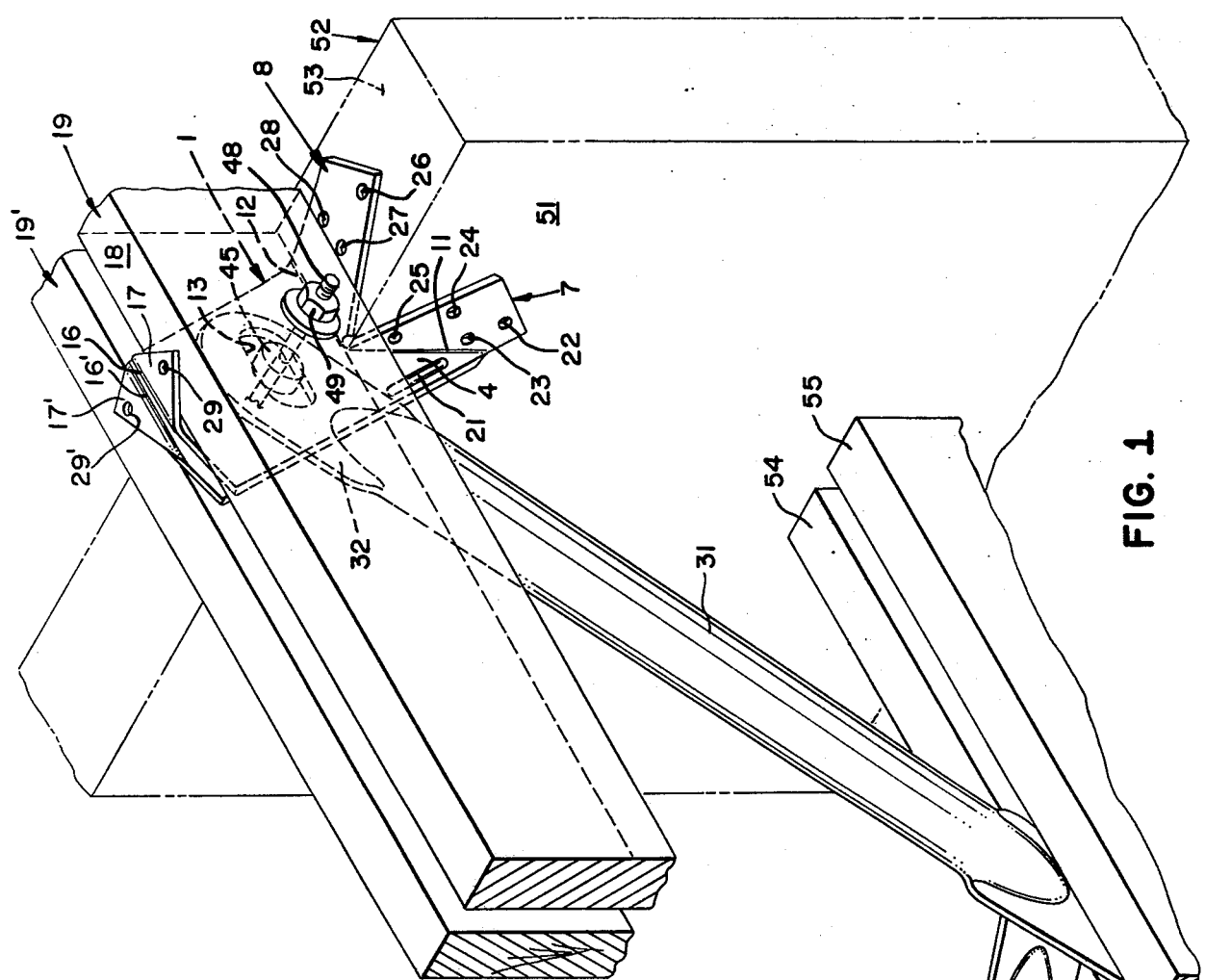
FIG. 1 is a perspective view of the truss top-bearing clips of the present invention. The truss clips are shown supporting the top chords of a truss in which the end joints are constructed in accordance with the principles taught in my pending application Ser. No. 507,943 filed Sept. 20, 1974 and entitled TRUSS STRUCTURE WITH JOINT ASSEMBLY, now U.S. Pat. No. 3,946,532. Portions of the truss are in cross section and cut away for purposes of clarity.
Figure 2:
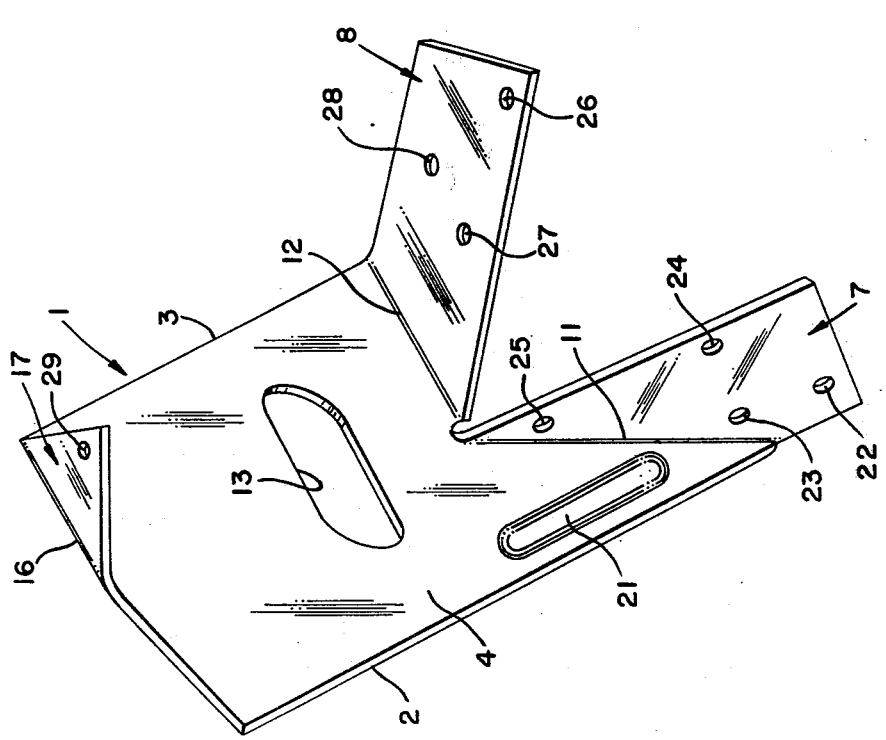
FIG. 2 is an enlarged perspective view of one of the top-bearing clips shown in FIG. 1.

The truss top-bearing clip 1 of the present invention is fabricated from a generally rectangular planar metal sheet having side edges 2 and 3 with a portion forming a web support portion 4. The sheet is sheared along a line 6 running generally parallel to the long dimension of the sheet and the line is spaced from the side edges thereby dividing a portion of the sheet into first and second flanges 7 and 8. The first flange is bent along a first bend line 11 at an angular relation to the shear line so that the first flange is at right angles to the web support portion. The second flange is bent along a second bend line 12 at an angle to the shear line and at a greater angle to the first line so that the second flange is at a right angle to the web support portion and to the first flange. An opening 13 is formed in the web support portion.

In order to provide the truss clip with the ability to be adjustable, the opening 13 in the web support portion is a slot running generally parallel to the second bend line 12.

The upper portion of the sheet along a portion of the shorter edge opposite the sheared portion is bent along a line 16 parallel to the second bend line forming a top flange 17 at right angles to the sheet member. This top flange is in contact with the top face 18 of top chord 19.

The web support portion of the sheet is formed with an elongated embossment 21 located inwardly from the side edge and between the edge and the first bend line. The embossment rigidizes the web support portion and prevents buckling of the sheet member.

The flanges are formed with nail receiving openings. The first flange is formed with openings 22 – 25; the second flange is formed with openings 26 – 28 and the top flange is formed with opening 29.

Figure 3:
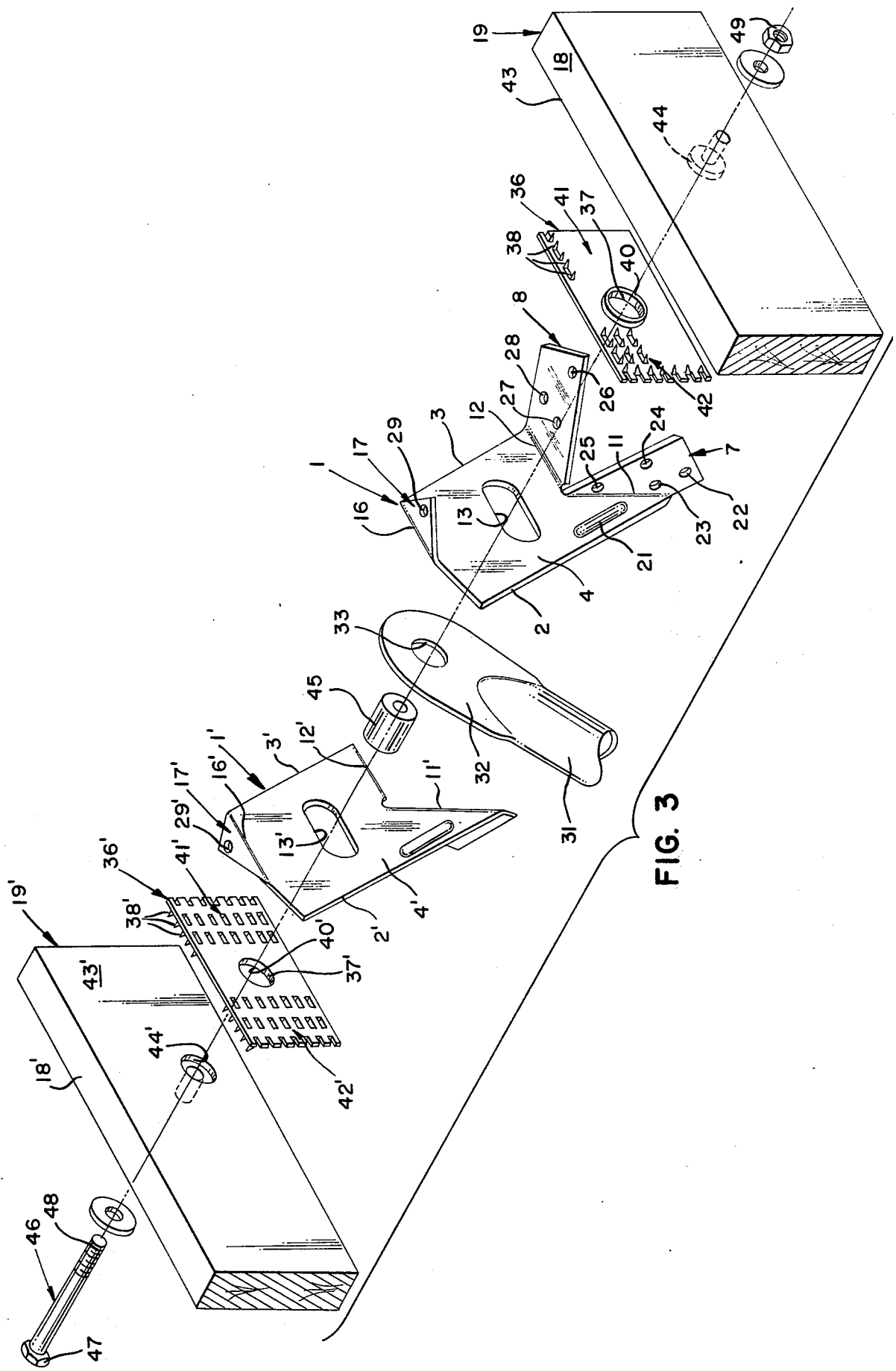
FIG. 3 is an exploded perspective view of the truss top-bearing clips and truss joint assembly shown in FIG. 1. Portions only of the chords are shown in cross section.
Figure 10:
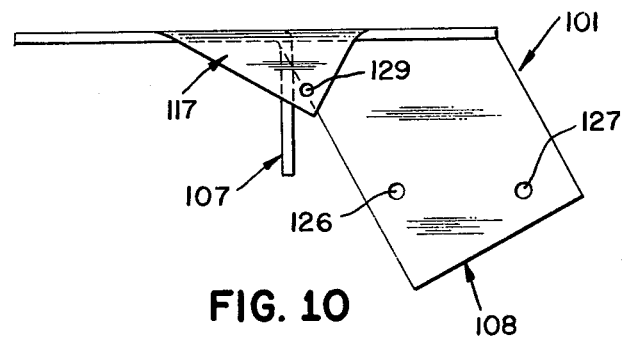
FIG. 10 is a top plan view of the clip shown in FIG. 9.
Figure 11:
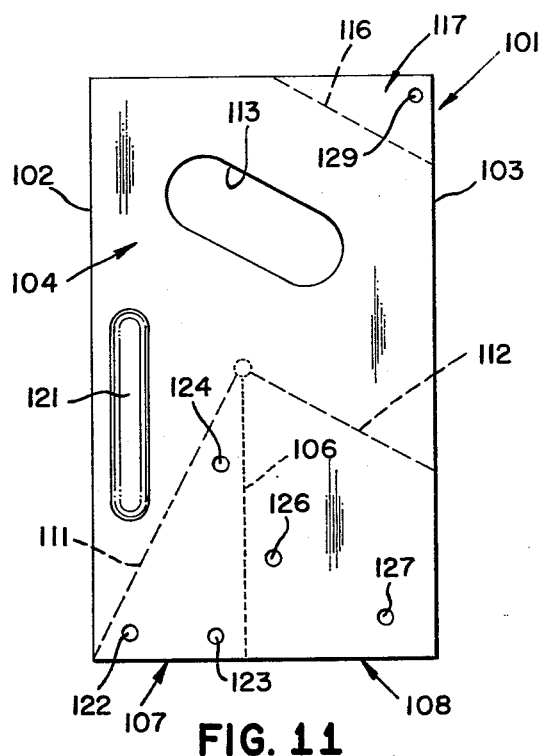
FIG. 11 is a side elevation view of the clip shown in FIGS. 8, 9 and 10 prior to bending of the sheet metal.
Figure 9:
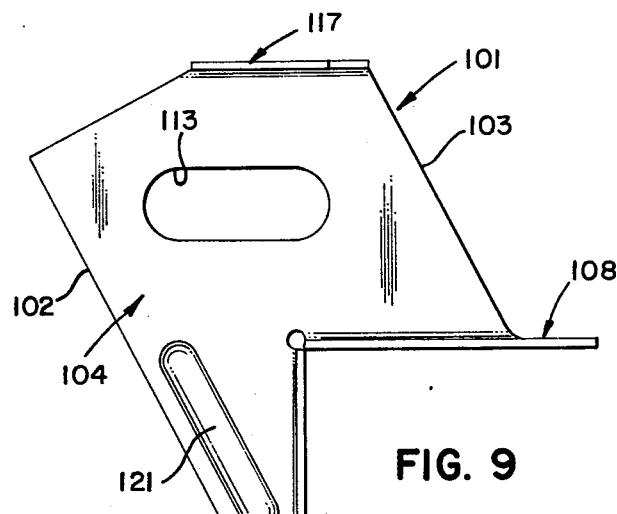
FIG. 9 is a side elevation view of one of the truss top-bearing clips shown in FIG. 8.
Figure 12:
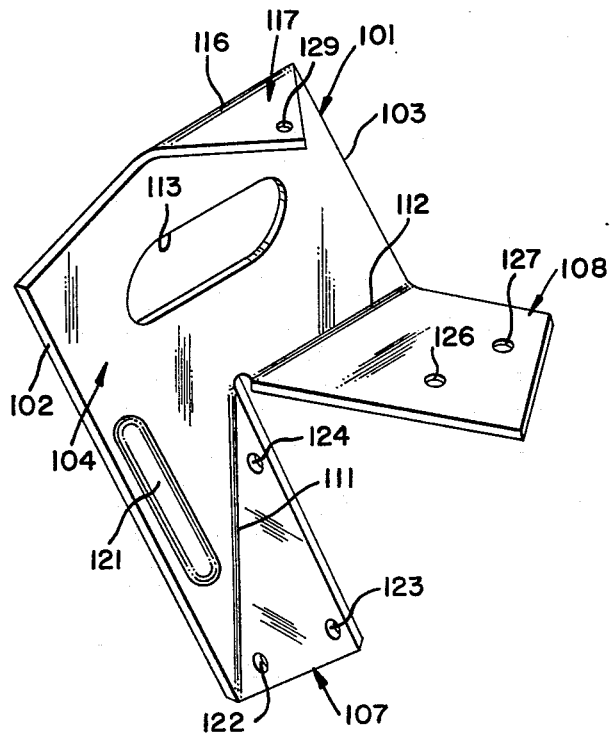
FIG. 12 is a perspective view of the clip shown in FIGS. 9 and 10.

Referring to FIGS. 1, 3 and 4, the top-bearing clips of the present invention are shown holding a truss constructed in accordance with the disclosure of U.S. patent application Ser. No. 507,943 filed Sept. 20, 1974, now U.S. Pat. No. 3,946,532. The truss joint assembly wherein the upper chord consists of two juxtaposed parallel lumber members 19 and 19' and the end web member 31 has a flattened end area 32 with an opening 33 and is interposed between the lumber members consists briefly of a pair of sheet metal fastener plates 36 and 36'. Each plate has an opening 37 and 37' therethrough and is formed with a plurality of sharp pointed fastener means 38 and 38' connecting the fastener areas 41, 41', 42 and 42' of the plates to the inside faces 43 and 43' of the lumber members. Each of the openings in the plates is surrounded by integrally formed drawn sidewalls extending into the lumber members forming a coaxial annular flange 40 and 41' providing bearing area. To accommodate the annular flanges in a force fit, enlarged countersunk openings 44 and 44' are formed in the inside faces of the lumber members. A metal load transfer member such as a sleeve 45 having a diameter and a length dimensioned to transfer loads between the metal fastener plates and the metal web members by bearing against a substantial portion of the metal plate flanges in a force fit and against the edges of the openings in the metal web members is provided. Means such as a pin 46 with a head 47 and a threaded end 48 and nut 49 holds the members of the assembly together.

As shown in the drawings, two top-bearing clips are used with each end bearing assembly. The first clip has been previously described and the second clip 1' is identical except that the flanges are bent the opposite directions. The second clip is formed from a generally rectangular planar metal sheet having side edges 2' and 3' with a portion forming a web support portion 4'. The sheet is sheared along a line running generally parallel to the long dimensions of the sheet, spaced from the side edges, dividing a portion of the sheet into first and second flanges 7' and 8'. The first flange is bent along a first bend line 11' at an angle to the shear line and at a greater angle to the first line so that the second flange is at a right angle to the web support portion of the sheet and to the first flange. An opening 13' is formed in the web support portion. A top flange 17' is formed by bending a portion of the sheet metal along line 16'. Nail openings are formed in the flanges of the second clip as described in the first clip. Nail openings 22' – 25' are formed in the second flange and nail opening 29' is formed in the top flange. Corresponding nail openings are also formed in the first flange.

A unique feature of the present invention is the fact that truss clips to hold trusses with 2 × 4 inches as well as 2 × 6 inch top chords may be fabricated from strips of metal having the same width. For example, to construct a clip for a 2 × 4 inch top chord the distance between the opening and the top flange is reduced and the first and second flanges are shortened. The alternate form of the invention is shown in FIGS. 8 – 12 of the drawings. The shapes of the elements of the clip are changed slightly but the function is identical. Like parts of the modified clip have been given similar numbers (add 100 to each number) for ease in understanding and comparing the two clips.

The clip 101 consists briefly of a generally rectangular planar metal sheet having side edges 102 and 103 with a portion forming a web support portion 104. The sheet is sheared along a line 106 running generally parallel to the long dimension of the sheet and the line is spaced from the side edges thereby dividing a portion of the sheet into first and second flanges 107 and 108. The first flange is bent along a first bend line 111 at an angular relation to the shear line so that the first flange is at right angles to the web support portion. The second flange is bent along a second bend line 112 at an angle to the shear line and at a greater angle to the first line so that the second flange is at a right angle to the web support portion and to the first flange. An opening 113 is formed in the web support portion. Preferably the opening is a slot running generally parallel to the second bend line 112.

The upper portion of the sheet metal along a portion of the shorter edge opposite the sheared portion is bent along a line 116 parallel to the second bend line forming a top flange 117 at right angles to the sheet member. This top flange is in contact with the top face 118 of top chord 119.

The web support portion of the sheet is formed with an elongated embossment 121 located inwardly from the side edge and between the edge and the first bend line.

The flanges are formed with nail receiving openings. The first flange is formed with openings 122 – 124; the second flange is formed with openings 126 and 127 and the top flange is formed with opening 129.

Figure 8:
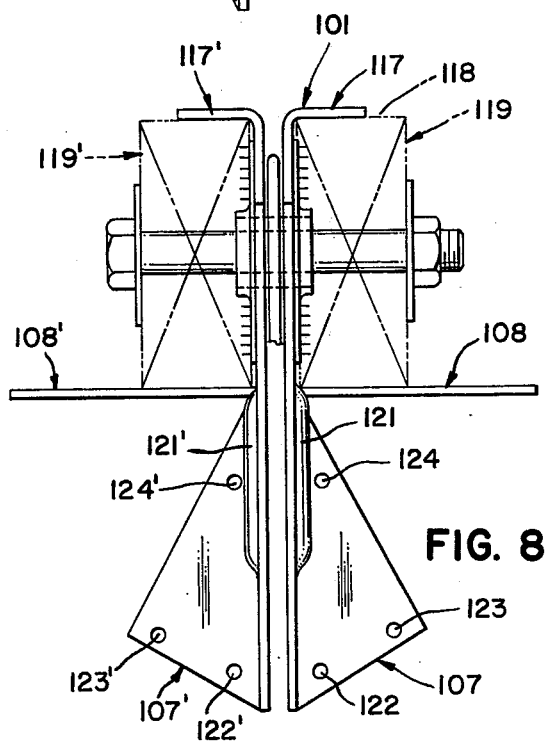
FIG. 8 is a front elevation view of a modified form of the truss top-bearing clips and the truss joint assembly. The top chords of the truss are shown in cross section.

FIG. 8 shows two of the modified clips holding the top chord members 119 and 119'. Two clips are used to hold the ends of the truss member. The other clip is identical to the first clip except the flanges are bent the opposite directions. Some like parts are number with (') prime marks in FIG. 8.

The truss clips of the present invention may be assembled at the factory on the ends of the trusses. At the job site, the flanges 7 and 7' are attached to the face 51 of a plate member 52 and the flanges 8 and 8' are nailed to the top face 53 of the plate member. If the walls are not aligned, the clips can be adjusted by loosening nut 49. A portion of the bottom chord members 54 and 55 as well as a portion of another web 56 of the truss are shown in FIG. 1.

The clips of the present invention may be made of 12 and 14 gauge steel for example.

Some typical dimensions for a clip dimensioned to hold a 2 × 6 inch top chord are as follows: The rectangular sheet member may be 4½ inches by 11 inches. The first flange is 2½ inches and the second flange is 2 inches wide. The shear line is 5⅛ inches long. The opening is 1 inch wide with a straight line length of 1½ inches. The end radii are ½ inch. The embossment is ½ inch wide and about 2½ inches long.

Dimensions for the clip for the 2 × 4 inch chords are 4½ inches by 7½ inches. The shear line is 3 9/16 inches.

I claim:
1. A truss top-bearing clip comprising:
  a. a generally rectangular planar metal sheet having side edges with a portion forming a web support portion;
  b. said sheet is sheared along a line running generally parallel to the long dimension of said sheet, spaced from said side edges, dividing a portion of said sheet into first and second flanges;
  c. said first flange is bent along a first bend line at an angular relation to said shear line so that said first flange is at right angles to said web support portion;
  d. said second flange is bent along a second bend line at an angle to said shear line and at a greater angle to said first line so that said second flange is at a right angle to said web support portion and to said first flange; and
  e. an opening formed in said web support portion.
2. A truss clip as described in claim 1 comprising:
  a. said opening in said web support portion is a slot generally parallel to said second bend line.
3. A truss clip as described in claim 1 comprising:
  a. a portion of said sheet along a portion of the shorter edge opposite the sheared portion is bent along a line parallel to said second bend line forming a top flange at right angles to the web support portion of said sheet member.
4. A truss clip as described in claim 1 comprising:
  a. said web support portion of said sheet is formed with an elongated embossment located inwardly from the side edge and between said edge and said first bend line.
5. A truss clip as described in claim 1 comprising:

a. said flanges are formed with nail receiving openings.

6. A truss clip as described in claim 2 comprising:
   a. a portion of said sheet along a portion of the shorter edge opposite the sheared portion is bent along a line parallel to said second bend line forming a top flange at right angles to said web support portion of said sheet member;
   b. said web support portion of said sheet is formed with an elongated embossment located inwardly from said side edge and between said edge and said first bend line; and
   c. said flanges are formed with nail receiving openings.

7. In a truss joint assembly of a composite truss having upper and lower chords joined by a plurality of metal inner and end webs wherein the upper truss chord consists of two juxtaposed parallel lumber members and said inner and end web members have end areas with an opening therethrough which are interposed between said upper chord lumber members; a pair of sheet metal fastener plates, each including an opening therethrough, and formed with a plurality of sharp pointed fastener means connecting said fastener areas of said plates to the inside faces of said lumber members; each of said openings in said plates is surrounded by integrally formed drawn sidewalls extending into said lumber members forming a coaxial annular flange providing bearing area; there being enlarged countersunk openings in the inside faces of said lumber members dimensioned to receive said annular flanges of said plates in a force fit; a metal load transfer member having a diameter and a length dimensioned to transfer loads between said metal fastener plates and said metal web members by bearing against a substantial portion of said metal plate flanges in a force fit, and against the edges of said openings in said metal web members; and means providing lateral support for holding the members of said assembly together; the improvement comprising:
   a. a pair of top-bearing clips each having:
      1. a generally rectangular planar metal sheet having side edges with a portion forming a web support portion;
      2. said sheet is sheared along a line running generally parallel to the long dimension of said sheet, spaced from said side edges, dividing a portion of said sheet into first and second flanges;
      3. said first flange is bent along a first bend line at an angle to said shear line and at a greater angle to said first line so that said second flange is at a right angle to said web support portion of said sheet and to said first flange; and
      4. an opening formed in said web support portion.

* * * * *